June 12, 1962   J. S. BENTLEY   3,038,730
APPARATUS HAVING FAIRLEAD AND SEALING STRUCTURE
FOR ACCOMMODATING CONTROL CABLE AND THE LIKE
Filed May 23, 1958
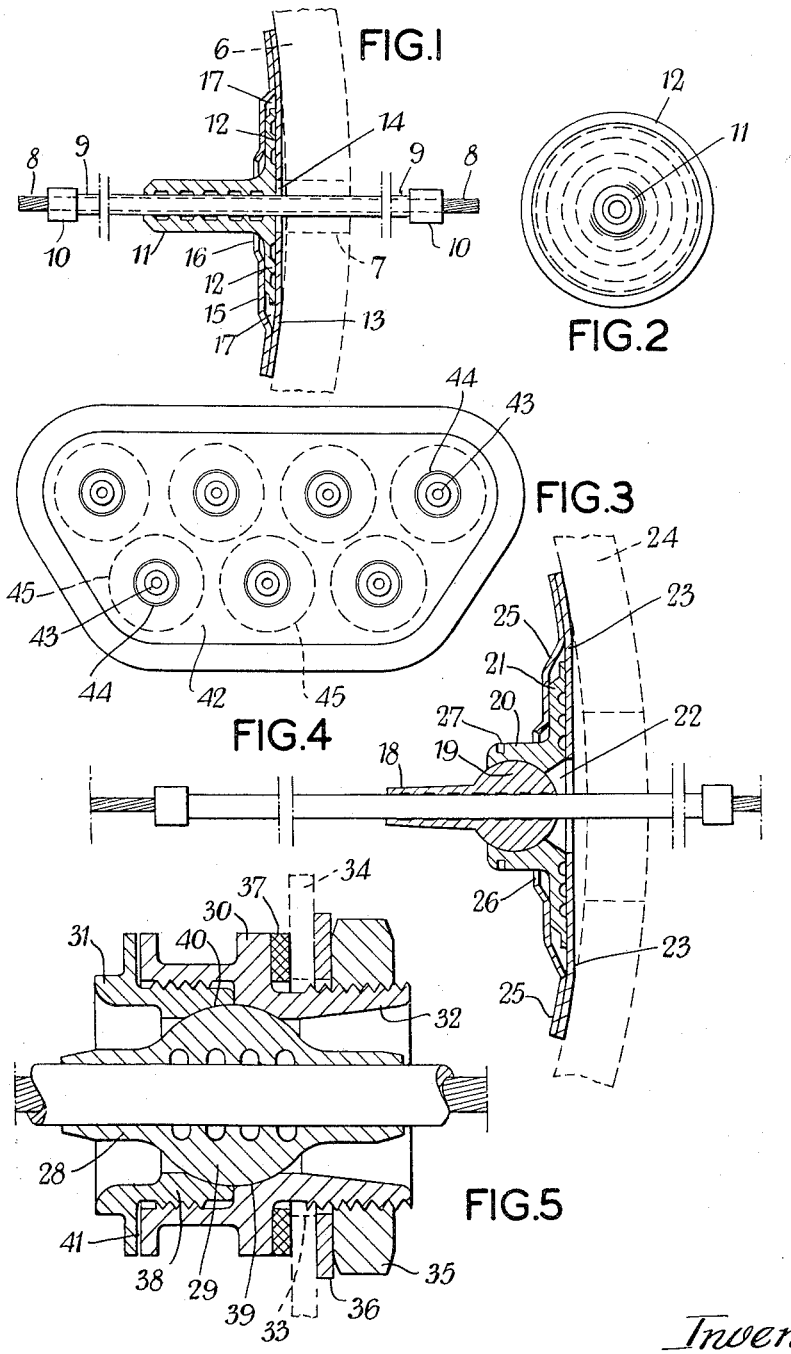
Inventor
James Sydney Bentley
By: Olson & Trexler
attys.

United States Patent Office 3,038,730
Patented June 12, 1962

3,038,730
APPARATUS HAVING FAIRLEAD AND SEALING STRUCTURE FOR ACCOMMODATING CONTROL CABLE AND THE LIKE
James Sydney Bentley, London, England, assignor to Teleflex Incorporated, Wilmington, Del., a company of Delaware
Filed May 23, 1958, Ser. No. 737,341
Claims priority, application Great Britain May 28, 1957
3 Claims. (Cl. 277—4)

This invention relates to controls which comprise movable cables, rods or the like and fairleads therefor, and has for its object to provide such devices for enabling the movable member such as a cable or rod to pass through a bulkhead or other dividing wall or partition, between two zones at different pressures, with a minimum of friction and with little, if any, leakage of the relatively compressed fluid which is in one zone.

Although not limited thereto, the invention is particularly suitable for use in high-flying aircraft in which cable and like controls pass from cabins or cockpits occupied by human beings where the air must be maintained at relatively high pressure, to other zones such as wing interiors and luggage compartments which can remain at ambient pressure.

According to the present invention, the portion of the movable member which works through the bulkhead or the like, is covered for a length somewhat in excess of that of its maximum movement, with a close-fitting sleeve or cover of polytetrafluoroethylene (hereinafter termed "p.t.f.e."), and there is also provided a short tubular fairlead of this same material, which projects axially from the surface of the bulkhead in line with the opening therethrough in a fluid-tight manner, for example, by an integral shaped base held against the surface of the bulkhead by suitable means.

The fairlead, in some cases, at its inner end or in an intermediate position, can be formed on the exterior as a part sphere, mounted for universal movement and as a close fluid-tight fit in a correspondingly formed hollow part-spherical bearing, which may be of p.t.f.e., and which may have a more or less flat integral base generally similar to that already described. It may, however, be carried in a two-part fitting with portions of the hollow part-spherical bearing in the two parts thereof, which fitting is secured in a fluid-tight manner in the opening in the bulkhead.

In order that the invention may be better understood, it will now be described with reference to the accompanying drawings, which are given by way of example only and in which:

FIG. 1 is a cross-sectional elevation of one form of fairlead and associated movable member for aircraft mounting, constructed in accordance with the invention.

FIG. 2 is an end view of the combined fairlead and base of the fitting shown in FIG. 1.

FIG. 3 shows to half the scale of FIGS. 1 and 2, an end view of a "bank" of fairleads similar to that shown in FIGS. 1 and 2, mounted in association.

FIG. 4 shows to the same scale as FIGS. 1 and 2, another method of carrying the invention into effect, and FIG. 5 shows to a scale twice that of FIGS. 1 and 4, a cross-sectional elevation of a still further method.

In FIG. 1, 6 is the bulkhead which is apertured at 7 for the passage of the movable member. This consists of a multi-stranded flexible cable 8 on which is threaded as a close fit a thin sleeve 9 of p.t.f.e. having a length somewhat in excess of the maximum distance of travel of the cable.

The sleeve is held in position by any suitable means to ensure that it moves with the cable. In some cases it may be a relatively tight-fitting sleeve but preferably, and as shown, ferrules 10 are secured to the cable at the ends of the sleeve. These ferrules may be crimped or swaged in position, or in some cases they may be definite clamping clips which are fastened in position by suitable clamping screws or otherwise.

11 is the short fairlead which is of p.t.f.e. and the bore through which has the desired fluid-tight fit over the sleeve 9. This bore has a labyrinthine formation, as shown, and the fairlead projects from an integral base 12 of concentric circular form, the rear surface of which is of labyrinthine formation and makes fluid-tight surface contact with a rubbing plate 13 of metal, preferbaly stainless steel, secured to the bulkhead in a fluid-tight manner and apertured at 14 for the passage of the portion of the cable 8 covered by the sleeve 9. The front surface of the integral base 12 comes beneath and in forced contact with a keeper plate 15 of metal, preferably stainless steel, which has a central opening 16, preferably flared as shown, which comes around and is of greater diameter than the outer diameter of the fairlead 11. It is secured to the rubbing plate by suitable means and so shaped as to leave an annular space 17 around the periphery of the base 12 and the fairlead.

By this construction, the base 12 and the fairlead 11, while held in fluid-tight contact with the rubbing plate 13, can be moved in two directions, within the limits permitted by the central opening 16 of the keeper plate 15. Such movement is caused by the cable 8 and, amongst other reasons, is due to flexion set up in the aircraft and bending of the fuselage.

FIG. 4 shows a method of carrying the invention into effect where, in place of the fairlead 18 having a more or less flat integral base, its inner end is formed as part 19 of a sphere. This is mounted for universal movement and as a close fit in a correspondingly formed part-spherical bearing 20 of p.t.f.e. which has a more or less flat integral base 21 generally similar to that described with reference to FIGS. 1 and 2 and apertured at 22 for the passage of the cable 8 covered by the sleeve 9. Here again, in this case the flat base 21 is held in fluid-tight contact with a rubbing plate 23 which is secured to the bulkhead 24, being retained in position by a keeper plate 25 having a central aperture 26. The construction and mounting permits the base to have the two-directional movement already described. In addition, the fairlead 18 can be caused to take small angular movements in any direction owing to the universal mounting of the part-spherical portion 19 in the part-spherical bearing 20.

In this last-mentioned construction the part-spherical bearing 20 has an outer mouth of smaller diameter than the full diameter of the spherical portion 19, but this smaller diameter is such that the spherical portion 19 can be sprung through this smaller diametered portion to become seated in the bearing. This is facilitated by forming the exterior of the bearing adjacent the outer mouth with an annular groove 27 which aids the necessary temporary deformation and subsequent recovery. In this groove there may, if desired, be located a "circlip" to assist in maintaining the mounted spherical portion 19 in position. When, however, it is required to dismount this spherical portion from the bearing, it is necessary to remove the circlip.

In the form of the invention shown in FIG. 5, the fairlead 28 has a part-spherical shaped portion 29 in an intermediate position and this is mounted in a two-part fitting of metal comprising a body 30 and a plug 31. The body at one end has a hollow boss 32 which is screw-threaded on the exterior and is adapted to pass through the opening 33 in the bulkhead 34.

The body is mounted in position in this opening by a locknut 35 engaging the screw-thread on its exterior and co-operating with a washer 36 and a sealing ring 37.

The other end of the body has an interior screw-thread with which an exterior thread on the hollow boss 38 of the plug 31 engages. In an appropriate position the body 30 has a portion 39 of a part-spherical bearing, and similarly the plug has the co-operating portion 40 of said spherical bearing. These, as shown, meet in a diametric plane so that by unscrewing the plug 38 the fairlead can be removed from the body. Similarly, however, by mounting the fairlead in the body and then screwing-in the plug, the part-spherical portion 29 is brought into co-operative engagement in a practically air-tight manner with the portions 39 and 40 of the spherical bearing. In practice, the plug 31 is screwed into the body 30 by small angular amounts until the grip on the spherical portion of the fairlead has all the slack removed therefrom but permits the movement of the part-sphere 29 in the spherical bearing, yet so that fluid-tightness is secured. When the correct position has been ascertained, then a suitable packing or film of ring-like formation can be mounted in the space 41 between the adjacent flanges of the body and plug so that the parts can be screwed up, tightly gripping this film but leaving the required flexibility of movement between the parts.

With the forms shown in FIGS. 1 and 4, there may be a single fairlead and cable in association with rubbing and keeper plates. However, in some cases a bank or plurality of fairleads may be mounted between common rubbing and keeper plates. Such a construction is indicated in FIG. 3, which view shows the exterior of the keeper plate 42 which comes over the co-extensive rubbing plate, which plates are attached to the bulkhead or in equivalent position. As will be seen, this keeper plate on the exterior has, in the correct positions, the fairleads 43 projecting through openings 44 in the keeper plate to allow the required amount of two-directional movement to the said fairleads and the bases 45 associated therewith.

The invention is not limited to the precise forms or details of construction herein described, as these may be varied to suit particular requirements.

The invention is claimed as follows:

1. An apparatus of the type described comprising a movable elongated member in the form of a stranded cable adapted to be moved and returned through a predetermined maximum distance substantially along the path of its longitudinal axis, a close fitting smooth sleeve of polytetrafluorethylene secured to said elongated member for movement in unison therewith and presenting a smooth exterior bearing surface, said sleeve being relatively short but with a length somewhat in excess of said predetermined maximum distance for movement of the elongated member, a one-piece fairlead of polytetrafluoroethylene comprising an integral radially enlarged mounting portion and a projecting stem portion with an overall length substantially shorter than said sleeve and having a passageway therethrough of substantially uniform diameter at opposite ends thereof and closely slidable receiving said sleeve in substantially fluid tight sealing relationship, said fairlead having a labyrinth of annular grooves between the sealing ends thereof with the material of the fairlead between adjacent grooves in substantially fluid tight fit with said sleeve, said mounting portion of the fairlead comprising a spherical portion adapted for adjustable mounting on the bulkhead, and means engaging said mounting portion for mounting said fairlead for permissive movement relative to a bulkhead and in fluid tight relationship therewith dividing zones of different pressure at opposite sides of the bulkhead with the stem portion projecting in at least one direction from the bulkhead for guiding the sleeve and enclosed elongated member during movement thereof through a bulkhead opening sealed by the fairlead.

2. An apparatus as claimed in claim 1, wherein the annular grooves are disposed within the area of the spherical mounting portion.

3. An apparatus as claimed in claim 2, wherein the annular grooves are also disposed along the stem portion.

References Cited in the file of this patent

UNITED STATES PATENTS

| | | |
|---|---|---|
| 1,025,884 | Schmitt | May 7, 1912 |
| 1,983,368 | Hathorn | Dec. 4, 1934 |
| 2,390,928 | Del Mar et al. | Dec. 11, 1945 |
| 2,467,312 | Jack | Apr. 12, 1949 |
| 2,517,717 | Rose | Aug. 8, 1950 |
| 2,564,912 | McKissick | Aug. 21, 1951 |
| 2,647,774 | Newberry | Aug. 4, 1953 |
| 2,717,792 | Pelley | Sept. 13, 1955 |
| 2,846,246 | Peras | Aug. 5, 1958 |